United States Patent
Ling

(10) Patent No.: US 11,043,223 B2
(45) Date of Patent: *Jun. 22, 2021

(54) VOICEPRINT RECOGNITION MODEL CONSTRUCTION

(71) Applicant: Advanced New Technologies Co., Ltd., Grand Cayman (KY)

(72) Inventor: Qing Ling, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,829

(22) Filed: Jun. 19, 2020

(65) Prior Publication Data

US 2020/0321010 A1 Oct. 8, 2020

Related U.S. Application Data

(63) Continuation of application No. 15/870,048, filed on Jan. 12, 2018, now Pat. No. 10,714,094, which is a (Continued)

(30) Foreign Application Priority Data

Jul. 23, 2015 (CN) .......................... 201510438382.0

(51) Int. Cl.
*G10L 17/22* (2013.01)
*G10L 17/02* (2013.01)
(Continued)

(52) U.S. Cl.
CPC .............. *G10L 17/22* (2013.01); *G10L 15/08* (2013.01); *G10L 17/02* (2013.01); *G10L 17/06* (2013.01);
(Continued)

(58) Field of Classification Search
CPC .......... G10L 17/22; G10L 17/24; G10L 17/04
See application file for complete search history.

(56) References Cited

U.S. PATENT DOCUMENTS

| 5,913,192 A * | 6/1999 | Parthasarathy | ......... G10L 17/24 704/244 |
| 6,691,089 B1 * | 2/2004 | Su | ........................... G06F 21/32 704/244 |

(Continued)

FOREIGN PATENT DOCUMENTS

| CN | 102238189 | 11/2011 |
| CN | 102737634 | 10/2012 |

(Continued)

OTHER PUBLICATIONS

European Extended Search Report in European Application No. 16827187.2, dated Mar. 1, 2019. 7 pages.
(Continued)

*Primary Examiner* — Samuel G Neway
(74) *Attorney, Agent, or Firm* — Fish & Richardson P.C.

(57) ABSTRACT

Technologies related to voiceprint recognition model construction are disclosed. In an implementation, a first voice input from a user is received. One or more predetermined keywords from the first voice input are detected. One or more voice segments corresponding to the one or more predetermined keywords are recorded. The voiceprint recognition model is trained based on the one or more voice segments. A second voice input is received from a user, and the user's identity is verified based on the second voice input using the voiceprint recognition model.

18 Claims, 2 Drawing Sheets

Related U.S. Application Data continuation of application No. PCT/CN2016/088962, filed on Jul. 14, 2016.

(51) Int. Cl.
  *H04L 29/00* (2006.01)
  *H04L 29/06* (2006.01)
  *G10L 17/14* (2013.01)
  *G10L 17/24* (2013.01)
  *G10L 15/08* (2006.01)
  *G10L 17/06* (2013.01)
  *G10L 17/04* (2013.01)

(52) U.S. Cl.
  CPC ............. *G10L 17/14* (2013.01); *G10L 17/24* (2013.01); *H04L 29/00* (2013.01); *H04L 29/06* (2013.01); *G10L 17/04* (2013.01); *G10L 2015/088* (2013.01)

(56) References Cited

U.S. PATENT DOCUMENTS

| | | | | |
|---|---|---|---|---|
| 9,711,148 | B1* | 7/2017 | Sharifi | G10L 17/24 |
| 10,714,094 | B2* | 7/2020 | Ling | G10L 17/24 |
| 2004/0162726 | A1 | 8/2004 | Chang | |
| 2006/0229879 | A1* | 10/2006 | Yu | G06Q 30/06 |
| | | | | 704/273 |
| 2007/0239449 | A1* | 10/2007 | Luan | G10L 17/24 |
| | | | | 704/241 |
| 2009/0171660 | A1* | 7/2009 | Jian | G10L 17/20 |
| | | | | 704/246 |
| 2010/0063817 | A1* | 3/2010 | Toyama | G10L 17/04 |
| | | | | 704/243 |
| 2012/0065961 | A1 | 3/2012 | Latorre et al. | |
| 2015/0081295 | A1* | 3/2015 | Yun | G10L 17/04 |
| | | | | 704/236 |
| 2015/0302856 | A1* | 10/2015 | Kim | G10L 15/22 |
| | | | | 704/273 |
| 2016/0086607 | A1* | 3/2016 | Aley-Raz | G10L 17/12 |
| | | | | 704/246 |
| 2016/0365095 | A1* | 12/2016 | Lou Sky | G10L 17/04 |
| 2018/0137865 | A1* | 5/2018 | Ling | H04L 29/06 |

FOREIGN PATENT DOCUMENTS

| | | |
|---|---|---|
| CN | 102760434 | 10/2012 |
| CN | 103971700 | 8/2014 |
| CN | 104202486 | 12/2014 |
| CN | 104765996 | 7/2015 |
| CN | 104901926 | 9/2015 |
| CN | 105930892 | 9/2016 |
| CN | 107103480 | 8/2017 |
| CN | 107657463 | 2/2018 |
| JP | 2003076390 | 3/2003 |
| JP | 2003302999 | 10/2003 |
| JP | 2010237323 | 10/2010 |
| JP | 2011090483 | 5/2011 |
| JP | 2013235117 | 11/2013 |
| JP | 2014145932 | 8/2014 |
| JP | 2016538658 | 12/2016 |
| TW | 1577838 | 4/2017 |
| WO | WO2008111190 | 9/2008 |

OTHER PUBLICATIONS

International Search Report issued by the International Searching Authority in International Application No. PCT/CN2016/089962 dated Oct. 19, 2016; 11 pages.

Written Opinion in Singaporean Patent Application No. 11201800297W, dated Jan. 7, 2019, 7 pages.

Crosby et al., "BlockChain Technology: Beyond Bitcoin," Sutardja Center for Entrepreneurship & Technology Technical Report, Oct. 16, 2015, 35 pages.

Nakamato, "Bitcoin: A Peer-to-Peer Electronic Cash System," www.bitcoin.org, 2005, 9 pages.

PCT International Preliminary Report on Patentability in International Application No. PCT/CN2016/089962, dated Jan. 23, 2018, 10 pages (with English translation).

* cited by examiner

VOICEPRINT RECOGNITION MODEL CONSTRUCTION

This application is a continuation of and claims the benefit of priority of U.S. patent application Ser. No. 15/870,048, filed Jan. 12, 2018, which is a continuation of PCT Application No. PCT/CN2016/089962, filed on Jul. 14, 2016, which claims priority to Chinese Patent Application No. 201510438382.0, filed on Jul. 23, 2015, and each application is incorporated by reference in its entirety.

TECHNICAL FIELD

This disclosure relates to voice print modeling.

BACKGROUND

A voiceprint is a biometric feature of a human being that can be used to uniquely determine a person's identity. Voiceprint recognition can be based on anthrophonic and behavioral features of a particular human speaker. Security provided by voiceprint authentication can be comparable to other biometric authentication technologies, such as fingerprint or iris authentication. The hardware for performing voiceprint recognition includes a microphone, which is relatively inexpensive. Most voiceprint recognition methods are unrelated to language, dialect, or accent of a speaker, and there is normally no privacy issues in using voiceprint recognition. Voice signals are also convenient for transmission and reception, which can be suitable for applications based on the Internet or other telecommunication networks.

Voiceprint recognition can include two stages. The first stage is a registration stage, where a user records one or more voice segments to a voice recognition system. The system can construct a voiceprint recognition model for the user by using voiceprint features extracted from the recorded voice segments. The second stage is an application stage, where the user reads a predetermined text provided by the voice recognition system. The system automatically records the voice of the user, extracts voiceprint features, conducts a matching operation between the extracted voiceprint features and the constructed voiceprint recognition model, and determines whether the voiceprint features match the voiceprint recognition model for user identity authentication.

Voiceprint recognition can include text-dependent recognition and text-independent recognition. Text-dependent voiceprint recognition requires a user to read a piece of predetermined text for voiceprint registration. Voiceprint recognition modeling can be more easily performed since all users using text-dependent recognition read the same standard text. In contrast, text-independent recognition does not require a user to read a piece of specific text, which makes the voiceprint recognition modeling more difficult since no standard text can be used as a reference to register the user's voiceprint.

SUMMARY

The present disclosure describes methods and systems, including computer-implemented methods, computer program products, and computer systems for voiceprint recognition modeling for user identity authentication.

In an implementation, a first voice input from a user is received. One or more predetermined keywords from the first voice input are detected. One or more voice segments corresponding to the one or more predetermined keywords are recorded. The voiceprint recognition model is trained based on the one or more voice segments. A second voice input is received from a user, and the user's identity is verified based on the second voice input using the voiceprint recognition model.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the user does not need to dictate predetermined standard text for text-dependent voiceprint recognition modeling. Second, the voiceprint recognition modeling software does not need to include voiceprint recognition training guidance to the user. Third, the user does not need to dedicate time for voiceprint recognition training. The user's voiceprint is captured during normal use of voice input for performing applications. Fourth, a user's identity can be authenticated based on a voiceprint when the user dictates one or more of the predetermined keywords in the voice input. Because the predetermined keywords were collected before and used as samples for voiceprint recognition modeling, the accuracy of identifying the user's voiceprint can be improved. Fifth, the voiceprint recognition model can be easily customized. For example, the predetermined keywords can be limited to keywords that have already been collected. The voiceprint recognition model can also perform user identity authentication when the user's voice input includes more than a predetermined amount of predetermined keywords. Sixth, the voiceprint recognition model can be updated when more predetermined keywords are detected from the user. Seventh, the voiceprint recognition modeling and voiceprint recognition for user identity authentication can be integrated. For example, if a user's voice input includes one or more predetermined keywords, they can be used to verify the user's identity and as voice segment samples for improving the voiceprint recognition model.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
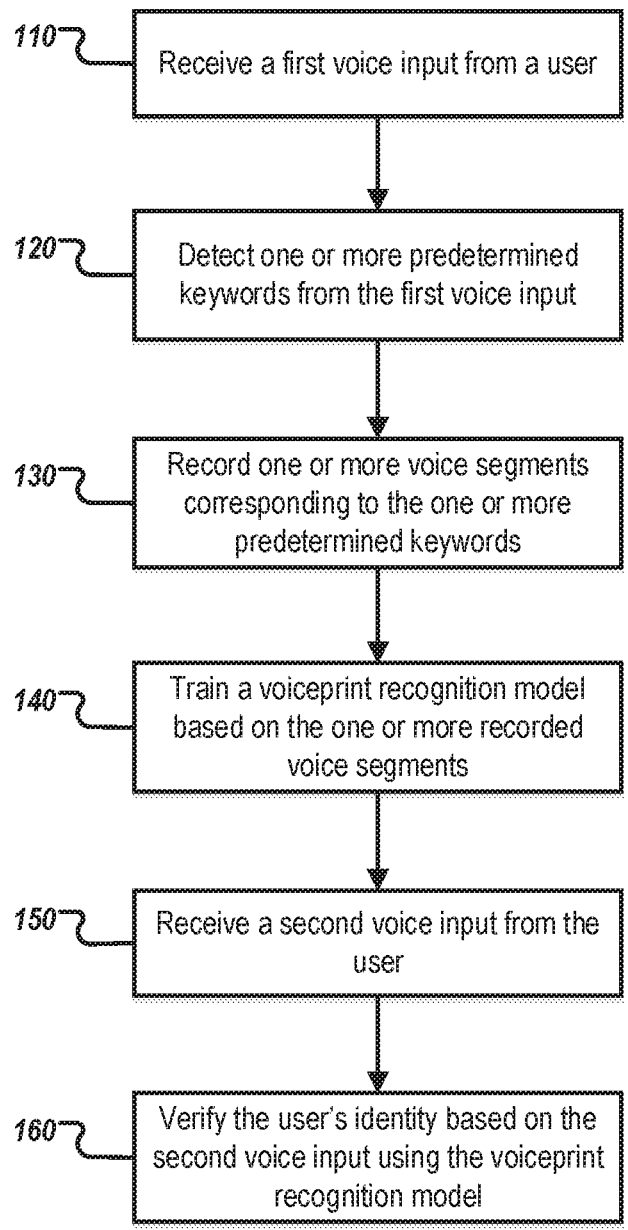
FIG. 1 is a flowchart illustrating an example of a method for constructing a user voiceprint recognition model, according to an implementation of the present disclosure.

The following detailed description describes constructing a user voiceprint recognition model, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A voiceprint is a biometric feature of a human being that can be used to uniquely determine a person's identity. Voiceprint recognition can be based on anthrophonic and behavioral features of a particular human speaker. Security provided by voiceprint authentication can be comparable to other biometric authentication technologies, such as fingerprint or iris authentication. The hardware for performing voiceprint recognition includes a microphone, which is relatively inexpensive. Most voiceprint recognition methods are unrelated to language, dialect, or accent of a speaker, and there is normally no privacy issues in using voiceprint recognition. Voice signals are also convenient for transmission and reception, which can be suitable for applications based on the Internet or other telecommunication networks.

Voiceprint recognition can include two stages. The first stage is a registration stage, where a user records one or more voice segments to a voice recognition system. The system can construct a voiceprint recognition model for the user by using voiceprint features extracted from the recorded voice segments. The second stage is an application stage, where the user reads a predetermined text provided by the voice recognition system. The system automatically records the voice of the user, extracts voiceprint features, conducts a matching operation between the extracted voiceprint features and the constructed voiceprint recognition model, and determines whether the voiceprint features match the voiceprint recognition model for user identity authentication.

Voiceprint recognition can include text-dependent recognition and text-independent recognition. Text-dependent voiceprint recognition requires a user to read a piece of predetermined text for voiceprint registration. Voiceprint recognition modeling can be more easily performed since all users using text-dependent recognition read the same standard text. In contrast, text-independent recognition does not require a user to read a piece of specific text, which makes the voiceprint recognition modeling more difficult since no standard text can be used as a reference to register the user's voiceprint.

The present disclosure describes text-dependent voiceprint recognition modeling technologies that allow voiceprint recognition to be adaptively trained and updated without performing a voiceprint registration process. In other words, no standard text needs to be specifically recorded to train the voiceprint recognition model. The text used for voiceprint recognition modeling can include keywords related to a particular application scenario and that have high probability of being dictated by a user. For example, when the user inquires about a product by phone or voice message, the user is highly likely to dictate keywords, such as "name", "model", "functionality", "installation", and "instructions" (or similar keywords) related to the product. As another example, software applications executed using voice controls can use predefined voice commands useable for text-dependent voiceprint recognition modeling.

A voiceprint recognition model for voiceprint authentication can be trained during a user's normal use of voice input when using software applications. The user does not need to dictate predetermined standard text dedicated for training the voiceprint recognition model. Moreover, by using predetermined keywords for text-dependent voiceprint recognition, the accuracy of the voiceprint recognition can be retained.

FIG. 1 is a flowchart illustrating an example of a method 100 for constructing a user voiceprint recognition model, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 110, a first voice input is received from a user. The first voice input can include voice information related to an application scenario. In some cases, a user's identity is verified before the voice input is collected. For example, a software application can authenticate a user's identity based on input of a user ID and a password, a gesture, or a fingerprint.

At 120, one or more predetermined keywords are detected from the first voice input. The predetermined keywords are those with high likelihood to be spoken by a user in the application scenario. The one or more predetermined keywords can be detected using voice recognition software. If one or more predetermined keywords are detected, they can be used for text-dependent voiceprint recognition. The more predetermined keywords that are detected, the more samples can be generated based on the detected predetermined keywords. The samples can be used in text-dependent voiceprint recognition modeling for more reliable voiceprint recognition.

Voice recognition technology used for detecting the one or more predetermined keywords can include an acoustic model and a language model. The acoustic model manages a computation of a probability from a particular voice stream to syllables. The language model manages a computation of a probability from the syllables to words. From 120, method 100 proceeds to 130.

At 130, one or more voice segments corresponding to the one or more predetermined keywords are recorded. Under the acoustic model, a series of syllables of a voice stream can be divided into individual syllables. Each syllable can have a unique audio feature. In some cases, the voice input can be divided into voice segments using the acoustic model. One or more voice features of the voice segments can be compared with one or more voice features of the predetermined keywords. If the one or more voice features of the voice segments match the one or more voice features of the predetermined keywords, the voice input is determined to include the one or more predetermined keywords.

For example, assume that the predetermined keywords include: "transfer", "balance", "account", and "password". The voice recognition system can pre-store standard voice data with voice features of the standard voice data. If user's voice input is "what is my account balance?" The input can be divided to several voice segments based on the acoustic model. The voice segments "account" and "balance" can match the predetermined keywords pre-stored as standard voice data. As such, it can be determined that the voice input includes keywords that match the predetermined keywords and can be used for voiceprint recognition modeling.

In some cases, because a similar pronunciation can correspond to different words or characters, voice recognition can be performed based on the text of the predetermined keywords, and the predetermined keywords can be used as search terms of the voice input. For example, assume that "account" and "balance" are predetermined keywords used for voiceprint recognition. These predetermined keywords can be used to search a voice input of "what is my account balance." When the keywords "account" and "balance" are detected, they can be extracted as voice segments based on their relative positions in the voice input for voiceprint recognition modeling. From 130, method 100 proceeds to 140.

At 140, a voiceprint recognition model is trained based on the one or more recorded voice segments. The voiceprint recognition model can be updated as more voice segments that match the predetermined keywords are detected. The voiceprint recognition modeling can be initiated after at least one of the predetermined keywords is detected from a user's voice input. An initial voiceprint recognition model can be constructed after the at least one of the predetermined keywords is detected. Afterwards, voice input associated with the user can continue to be collected.

If a new voice segment is determined to match one or more predetermined keywords, the new voice segment can be used to update the voiceprint recognition model. For example, assume that the predetermined keywords include "transfer", "balance", "account", and "password". After a user dictates "what is my account balance", the voiceprint recognition modeling can be initiated since the voice segments "account" and "balance" match the predetermined keywords. If the user further dictates "I want to change my account password", the voice segments corresponding to the words "account" and "password" can be used to further improve the voiceprint recognition modeling. In some cases, only keywords that are not previously detected as predetermined keywords are used for updating the voiceprint recognition model. For example, only "password" would be used to update the voiceprint recognition model.

It can be understood from the previous description that the voiceprint recognition model can be constantly improved to meet different security requirements. The more predetermined keywords that are detected, the more voice segments that can be used to improve the voiceprint recognition model. When a system has stringent security requirements, the system can require a certain number of predetermined keywords to be collected for training the voiceprint recognition model. As such, the accuracy of the model can be high enough to ensure security. In some implementations, the voiceprint recognition model can be based on machine learning technologies and trained by continuously collecting voice segment samples to improve voiceprint recognition performance, such as recognition accuracy and fault tolerance.

In some cases, training of the voiceprint recognition model can also be improved by collecting voice data of a same user for the same keyword multiple times. For example, when the keywords "account" and "balance" are detected within a user's voice input that match the predetermined keywords, the system can look for the two keywords in subsequent voice input of the user and use the additionally-detected voice segments of the two keywords to improve the voice recognition model.

In some cases, a limitation for a keyword can be set. For example, when a keyword has been detected for a certain number of times, the system can stop collecting voice segments corresponding to the keyword. In some implementations, when multiple voice segment samples are collected for a keyword, the samples can be processed by using methods such as averaging and simultaneous retaining. From 140, method 100 proceeds to 150.

At 150, a second voice input from the user is received. The second voice input can be a regular voice command used by the user executing a software application that requires user identity authentication. The voiceprint information included in the second voice input can be used to verify the user's identity based on the voiceprint recognition model. From 150, method 100 proceeds to 160.

At 160, the user's identity is verified based on the second voice input using the voiceprint recognition model. After voiceprint recognition modeling based on the predetermined keywords extracted from a user's voice input, the voiceprint recognition model can determine the user's voiceprint features and use them to verify the user's identity based on a random voice input of the user. After 150, method 100 ends.

The technologies disclosed in the present disclosure can include one or more of the following advantages. First, although training of the voiceprint recognition model is text-dependent, the user does not need to dictate standard text predetermined for voiceprint recognition modeling. The developer of the voice recognition software does not need to provide voiceprint recognition modeling guidance to the user. The user does not need to dedicate time for voiceprint recognition training. The user's voiceprint is captured during normal use of voice input for performing applications. For example, when using voice service for online banking, a user can say "what is my account balance" when prompt with "in a few words, please describe what we can help you with?" The keywords "account" and "balance" are highly likely to be dictated by a user using online banking service, they can be set as predetermined keywords to train a voiceprint recognition model for the user. After the voiceprint recognition model is trained, the user's identity can be verified when using voice input for future online banking services. There is no need to perform additional user identity authentication since the user's identity is authenticated based on the voiceprint.

In some cases, to further enhance security, a user's identity can be authenticated based on voiceprint when the user dictates one or more of the predetermined keywords in the voice input. Because the predetermined keywords were collected before and used as samples for voiceprint recognition modeling, the accuracy of correctly identifying the user's voiceprint can be improved. If the user's voice input does not include any of the predetermined keywords already collected, conventional user identity authentication methods such as verifying user ID and password can be used for security authentication.

Moreover, the voiceprint recognition model can be customized. For example, the predetermined keywords can be limited to keywords that have already been collected. As such, the system can detect keywords from the user's voice input that have been previously input. The voiceprint recognition model can also perform user identity authentication when the user's voice input includes more than a predetermined amount of predetermined keywords.

Moreover, the voiceprint recognition modeling and voiceprint recognition for user identity authentication can be integrated in certain cases. For example, if a user's voice input includes one or more predetermined keywords, they can be used to verify the user's identity and as voice segment samples for improving the voiceprint recognition model. For security reasons, voice segment samples can be used for developing the voiceprint recognition model if the voiceprint of the samples can pass the security authentication.

Figure 2:
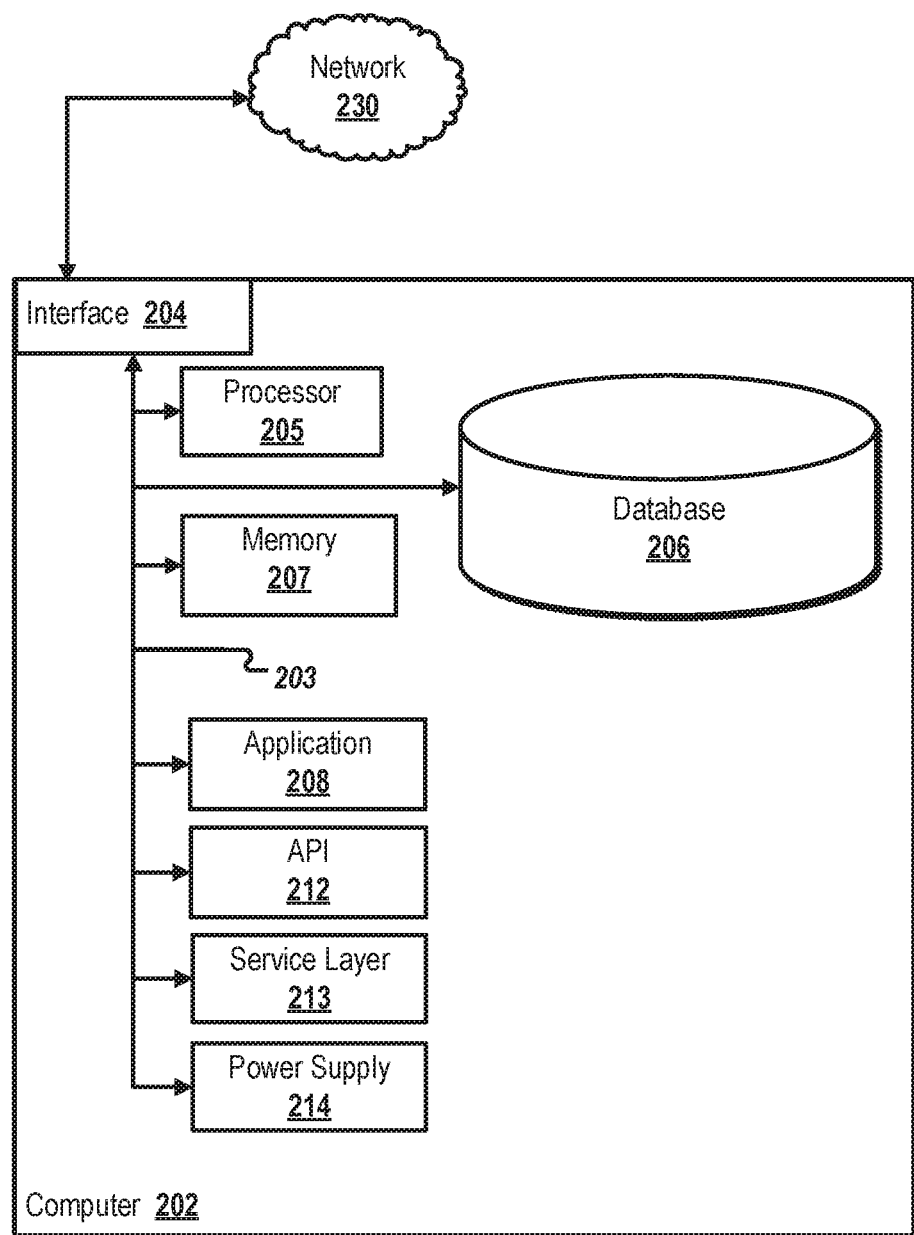
FIG. 2 is a block diagram illustrating an example of a computer-implemented system used to provide computational functionalities associated with described algorithms, methods, functions, processes, flows, and procedures, according to an implementation of the present disclosure.

FIG. 2 is a block diagram illustrating an example of a computer-implemented System 200 used to provide computational functionalities associated with described algorithms, methods, functions, processes, flows, and procedures, according to an implementation of the present disclosure. In the illustrated implementation, System 200 includes a Computer 202 and a Network 230.

The illustrated Computer 202 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 202 can include an input device, such as a keypad, keyboard, touch screen, another input device, or a combination of input devices that can accept user information, and an output device that conveys information associated with the operation of the Computer 202, including digital data, visual, audio, another type of information, or a combination of types of information, on a graphical-type user interface (UI) (or GUI) or other UI.

The Computer 202 can serve in a role in a distributed computing system as a client, network component, a server, a database or another persistency, another role, or a combination of roles for performing the subject matter described in the present disclosure. The illustrated Computer 202 is communicably coupled with a Network 230. In some implementations, one or more components of the Computer 202 can be configured to operate within an environment, including cloud-computing-based, local, global, another environment, or a combination of environments.

At a high level, the Computer 202 is an electronic computing device operable to receive, transmit, process, store, or manage data and information associated with the described subject matter. According to some implementations, the Computer 202 can also include or be communicably coupled with a server, including an application server, e-mail server, web server, caching server, streaming data server, another server, or a combination of servers.

The Computer 202 can receive requests over Network 230 (for example, from a client software application executing on another Computer 202) and respond to the received requests by processing the received requests using a software application or a combination of software applications. In addition, requests can also be sent to the Computer 202 from internal users (for example, from a command console or by another internal access method), external or third-parties, or other entities, individuals, systems, or computers.

Each of the components of the Computer 202 can communicate using a System Bus 203. In some implementations, any or all of the components of the Computer 202, including hardware, software, or a combination of hardware and software, can interface over the System Bus 203 using an application programming interface (API) 212, a Service Layer 213, or a combination of the API 212 and Service Layer 213. The API 212 can include specifications for routines, data structures, and object classes. The API 212 can be either computer-language independent or dependent and refer to a complete interface, a single function, or even a set of APIs. The Service Layer 213 provides software services to the Computer 202 or other components (whether illustrated or not) that are communicably coupled to the Computer 202. The functionality of the Computer 202 can be accessible for all service consumers using the Service Layer 213. Software services, such as those provided by the Service Layer 213, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 202, alternative implementations can illustrate the API 212 or the Service Layer 213 as stand-alone components in relation to other components of the Computer 202 or other components (whether illustrated or not) that are communicably coupled to the Computer 202. Moreover, any or all parts of the API 212 or the Service Layer 213 can be implemented as a child or a sub-module of another software module, enterprise application, or hardware module without departing from the scope of the present disclosure.

The Computer 202 includes an Interface 204. Although illustrated as a single Interface 204, two or more Interfaces 204 can be used according to particular needs, desires, or particular implementations of the Computer 202. The Interface 204 is used by the Computer 202 for communicating with another computing system (whether illustrated or not) that is communicatively linked to the Network 230 in a distributed environment. Generally, the Interface 204 is operable to communicate with the Network 230 and includes logic encoded in software, hardware, or a combination of software and hardware. More specifically, the Interface 204 can include software supporting one or more communication protocols associated with communications such that the Network 230 or hardware of Interface 204 is operable to communicate physical signals within and outside of the illustrated Computer 202.

The Computer 202 includes a Processor 205. Although illustrated as a single Processor 205, two or more Processors 205 can be used according to particular needs, desires, or particular implementations of the Computer 202. Generally, the Processor 205 executes instructions and manipulates data to perform the operations of the Computer 202 and any algorithms, methods, functions, processes, flows, and procedures as described in the present disclosure.

The Computer 202 also includes a Database 206 that can hold data for the Computer 202, another component communicatively linked to the Network 230 (whether illustrated or not), or a combination of the Computer 202 and another component. For example, Database 206 can be an in-memory, conventional, or another type of database storing data consistent with the present disclosure. In some implementations, Database 206 can be a combination of two or more different database types (for example, a hybrid in-memory and conventional database) according to particular needs, desires, or particular implementations of the Computer 202 and the described functionality. Although illustrated as a single Database 206, two or more databases of similar or differing types can be used according to particular needs, desires, or particular implementations of the Computer 202 and the described functionality. While Database 206 is illustrated as an integral component of the Computer 202, in alternative implementations, Database 206 can be external to the Computer 202.

The Computer 202 also includes a Memory 207 that can hold data for the Computer 202, another component or components communicatively linked to the Network 230 (whether illustrated or not), or a combination of the Computer 202 and another component. Memory 207 can store any data consistent with the present disclosure. In some implementations, Memory 207 can be a combination of two or more different types of memory (for example, a combination of semiconductor and magnetic storage) according to particular needs, desires, or particular implementations of the Computer 202 and the described functionality. Although illustrated as a single Memory 207, two or more Memories 207 or similar or differing types can be used according to particular needs, desires, or particular implementations of the Computer 202 and the described functionality. While Memory 207 is illustrated as an integral component of the Computer 202, in alternative implementations, Memory 207 can be external to the Computer 202.

The Application 208 is an algorithmic software engine providing functionality according to particular needs, desires, or particular implementations of the Computer 202, particularly with respect to functionality described in the present disclosure. For example, Application 208 can serve as one or more components, modules, or applications. Further, although illustrated as a single Application 208, the Application 208 can be implemented as multiple Applications 208 on the Computer 202. In addition, although illustrated as integral to the Computer 202, in alternative implementations, the Application 208 can be external to the Computer 202.

The Computer 202 can also include a Power Supply 214. The Power Supply 214 can include a rechargeable or non-rechargeable battery that can be configured to be either user- or non-user-replaceable. In some implementations, the Power Supply 214 can include power-conversion or management circuits (including recharging, standby, or another power management functionality). In some implementations, the Power Supply 214 can include a power plug to allow the Computer 202 to be plugged into a wall socket or another power source to, for example, power the Computer 202 or recharge a rechargeable battery.

There can be any number of Computers 202 associated with, or external to, a computer system containing Computer 202, each Computer 202 communicating over Network 230. Further, the term "client," "user," or other appropriate terminology can be used interchangeably, as appropriate, without departing from the scope of the present disclosure. Moreover, the present disclosure contemplates that many users can use one Computer 202, or that one user can use multiple computers 202.

Described implementations of the subject matter can include one or more features, alone or in combination.

For example, in a first implementation, a computer-implemented method, comprising: receiving a first voice input from a user; detecting one or more predetermined keywords from the first voice input; recording one or more voice segments corresponding to the one or more predetermined keywords; training the voiceprint recognition model based on the one or more voice segments; receiving second voice input from a user; and verifying the user's identity based on the second voice input using the voiceprint recognition model.

The foregoing and other described implementations can each, optionally, include one or more of the following features:

A first feature, combinable with any of the following features, further comprising detecting one or more predetermined keywords from the second voice input.

A second feature, combinable with any of the previous or following features, further comprising recording one or more voice segments corresponding to the one or more predetermined keywords from the second voice input.

A third feature, combinable with any of the previous or following features, further comprising updating the voiceprint recognition model based on the one or more voice segments corresponding to the one or more predetermined keywords from the second voice input.

A fourth feature, combinable with any of the previous or following features, further comprising determining the one or more predetermined keywords from the second voice input.

A fifth feature, combinable with any of the previous or following features, wherein the detection of the one or more predetermined keywords from the first voice input is based on an acoustic model and the one or more voice segments include one or more acoustic features same as the one or more predetermined keywords.

A sixth feature, combinable with any of the previous or following features, wherein the detection of the one or more predetermined keywords from the first voice input is performed based on voice recognition.

In a second implementation, a non-transitory, computer-readable medium storing one or more instructions executable by a computer system to perform operations comprising: receiving a first voice input from a user; detecting one or more predetermined keywords from the first voice input; recording one or more voice segments corresponding to the one or more predetermined keywords; training the voiceprint recognition model based on the one or more voice segments; receiving second voice input from a user; and verifying the user's identity based on the second voice input using the voiceprint recognition model.

The foregoing and other described implementations can each, optionally, include one or more of the following features:

A first feature, combinable with any of the following features, further comprising detecting one or more predetermined keywords from the second voice input.

A second feature, combinable with any of the previous or following features, further comprising recording one or more voice segments corresponding to the one or more predetermined keywords from the second voice input.

A third feature, combinable with any of the previous or following features, further comprising updating the voiceprint recognition model based on the one or more voice segments corresponding to the one or more predetermined keywords from the second voice input.

A fourth feature, combinable with any of the previous or following features, further comprising determining the one or more predetermined keywords from the second voice input.

A fifth feature, combinable with any of the previous or following features, wherein the detection of the one or more predetermined keywords from the first voice input is based on an acoustic model and the one or more voice segments include one or more acoustic features same as the one or more predetermined keywords.

A sixth feature, combinable with any of the previous or following features, wherein the detection of the one or more predetermined keywords from the first voice input is performed based on voice recognition.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving a first voice input from a user; detecting one or more predetermined keywords from the first voice input; recording one or more voice segments corresponding to the one or more predetermined keywords; training the voiceprint recognition model based on the one or more voice segments; receiving second voice input from a user; and verifying the user's identity based on the second voice input using the voiceprint recognition model.

The foregoing and other described implementations can each, optionally, include one or more of the following features:

A first feature, combinable with any of the following features, further comprising detecting one or more predetermined keywords from the second voice input.

A second feature, combinable with any of the previous or following features, further comprising recording one or more voice segments corresponding to the one or more predetermined keywords from the second voice input.

A third feature, combinable with any of the previous or following features, further comprising updating the voiceprint recognition model based on the one or more voice segments corresponding to the one or more predetermined keywords from the second voice input.

A fourth feature, combinable with any of the previous or following features, further comprising determining the one or more predetermined keywords from the second voice input.

A fifth feature, combinable with any of the previous or following features, wherein the detection of the one or more predetermined keywords from the first voice input is based on an acoustic model and the one or more voice segments include one or more acoustic features same as the one or more predetermined keywords.

A sixth feature, combinable with any of the previous or following features, wherein the detection of the one or more predetermined keywords from the first voice input is performed based on voice recognition.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving a first voice input from a user;
   obtaining a security requirement level of a system for training a voiceprint recognition model for the user;
   determining a minimum number of required keywords for training the voiceprint recognition model for the user, the minimum number of required keywords being based on the security requirement level of the system;
   detecting one or more predetermined keywords from the first voice input, wherein the one or more predetermined keywords include at least the minimum number of required keywords for the security requirement level;
   recording one or more voice segments corresponding to the one or more predetermined keywords;
   training the voiceprint recognition model based on the one or more voice segments corresponding to the minimum number of required keywords for the security requirement level;
   after training the voiceprint recognition model, receiving, from the user, second voice input;
   determining that the second voice input comprises a particular keyword that was not used to train the voiceprint recognition model;
   in response:
      capturing the second voice input having a representation of the particular keyword dictated by the user; and
      updating the voiceprint recognition model using the second voice input having the representation of the particular keyword dictated by the user that was not used to train the voiceprint recognition model;
   receiving, from the user, third voice input that comprises at least the minimum number of required keywords for the security requirement level; and
   verifying an identity of the user based on the third voice input using the trained voiceprint recognition model.

2. The computer-implemented method of claim 1, further comprising detecting one or more predetermined keywords from the third voice input.

3. The computer-implemented method of claim 2, further comprising recording one or more voice segments corresponding to the one or more predetermined keywords from the third voice input.

4. The computer-implemented method of claim 3, further comprising updating the voiceprint recognition model based on the one or more voice segments corresponding to the one or more predetermined keywords from the third voice input.

5. The computer-implemented method of claim 1, wherein detecting the one or more predetermined keywords from the first voice input is based on an acoustic model and the one or more voice segments include one or more acoustic features same as the one or more predetermined keywords.

6. The computer-implemented method of claim 1, wherein detecting the one or more predetermined keywords from the first voice input is performed based on voice recognition.

7. A non-transitory, computer-readable medium storing one or more instructions executable by a computer system to perform operations comprising:
   receiving a first voice input from a user;
   obtaining a security requirement level of a system for training a voiceprint recognition model for the user;
   determining a minimum number of required keywords for training the voiceprint recognition model for the user, the minimum number of required keywords being based on the security requirement level of the system;
   detecting one or more predetermined keywords from the first voice input, wherein the one or more predetermined keywords include at least the minimum number of required keywords for the security requirement level;
   recording one or more voice segments corresponding to the one or more predetermined keywords;

training the voiceprint recognition model based on the one or more voice segments corresponding to the minimum number of required keywords for the security requirement level;

after training the voiceprint recognition model, receiving, from the user, second voice input;

determining that the second voice input comprises a particular keyword that was not used to train the voiceprint recognition model;

in response:
 capturing the second voice input having a representation of the particular keyword dictated by the user; and
 updating the voiceprint recognition model using the second voice input having the representation of the particular keyword dictated by the user that was not used to train the voiceprint recognition model;

receiving, from the user, third voice input that comprises at least the minimum number of required keywords for the security requirement level; and verifying an identity of the user based on the third voice input using the trained voiceprint recognition model.

8. The non-transitory, computer-readable medium of claim 7, further comprising detecting one or more predetermined keywords from the third voice input.

9. The non-transitory, computer-readable medium of claim 8, further comprising recording one or more voice segments corresponding to the one or more predetermined keywords from the third voice input.

10. The non-transitory, computer-readable medium of claim 9, further comprising updating the voiceprint recognition model based on the one or more voice segments corresponding to the one or more predetermined keywords from the third voice input.

11. The non-transitory, computer-readable medium of claim 7, wherein detecting the one or more predetermined keywords from the first voice input is based on an acoustic model and the one or more voice segments include one or more acoustic features same as the one or more predetermined keywords.

12. The non-transitory, computer-readable medium of claim 7, wherein detecting the one or more predetermined keywords from the first voice input is performed based on voice recognition.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
 receiving a first voice input from a user;
 obtaining a security requirement level of a system for training a voiceprint recognition model for the user;
 determining a minimum number of required keywords for training the voiceprint recognition model for the user, the minimum number of required keywords being based on the security requirement level of the system;
 detecting one or more predetermined keywords from the first voice input, wherein the one or more predetermined keywords include at least the minimum number of required keywords for the security requirement level;
 recording one or more voice segments corresponding to the one or more predetermined keywords;
 training the voiceprint recognition model based on the one or more voice segments corresponding to the minimum number of required keywords for the security requirement level;
 after training the voiceprint recognition model, receiving, from the user, second voice input;
 determining that the second voice input comprises a particular keyword that was not used to train the voiceprint recognition model;
 in response:
  capturing the second voice input having a representation of the particular keyword dictated by the user; and
  updating the voiceprint recognition model using the second voice input having the representation of the particular keyword dictated by the user that was not used to train the voiceprint recognition model;
 receiving, from the user, third voice input that comprises at least the minimum number of required keywords for the security requirement level; and
 verifying an identity of the user based on the third voice input using the trained voiceprint recognition model.

14. The computer-implemented system of claim 13, further comprising detecting one or more predetermined keywords from the third voice input.

15. The computer-implemented system of claim 14, further comprising recording one or more voice segments corresponding to the one or more predetermined keywords from the third voice input.

16. The computer-implemented system of claim 15, further comprising updating the voiceprint recognition model based on the one or more voice segments corresponding to the one or more predetermined keywords from the third voice input.

17. The computer-implemented system of claim 13, further comprising determining the one or more predetermined keywords from the third voice input.

18. The computer-implemented system of claim 13, wherein detecting the one or more predetermined keywords from the first voice input is based on an acoustic model and the one or more voice segments include one or more acoustic features same as the one or more predetermined keywords.

* * * * *

UNITED STATES PATENT AND TRADEMARK OFFICE
CERTIFICATE OF CORRECTION

PATENT NO. : 11,043,223 B2  Page 1 of 1
APPLICATION NO. : 16/906829
DATED : June 22, 2021
INVENTOR(S) : Qing Ling It is certified that error appears in the above-identified patent and that said Letters Patent is hereby corrected as shown below:

On the Title Page (Page 2): Column 1, Line 1:
In the Related U.S. Application Data, delete "PCT/CN2016/088962" and insert
-- PCT/CN2016/089962 --, therefor.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*